R. D. ESTES.
CORN THINNER.
APPLICATION FILED NOV. 18, 1919.
1,394,291. Patented Oct. 18, 1921.
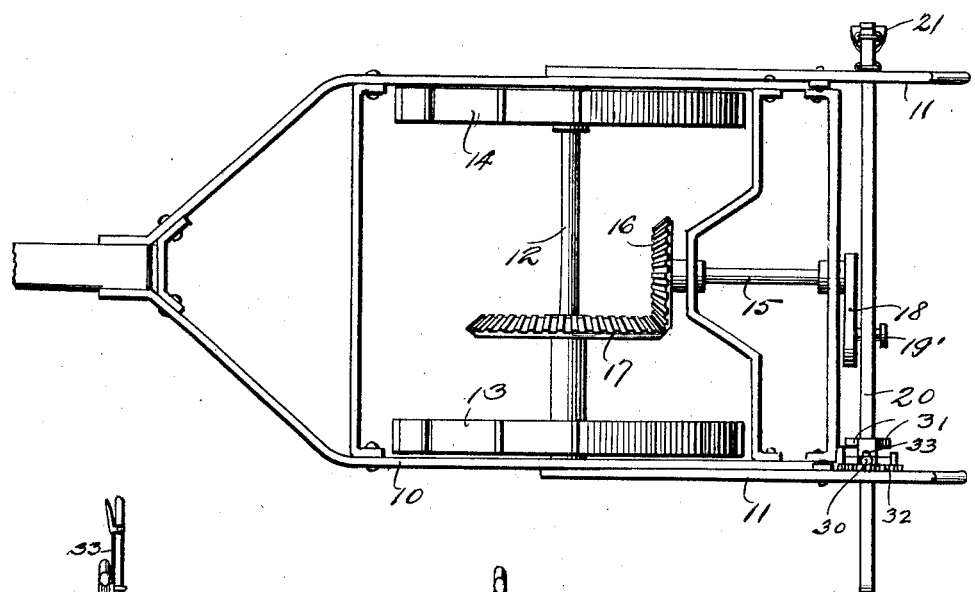
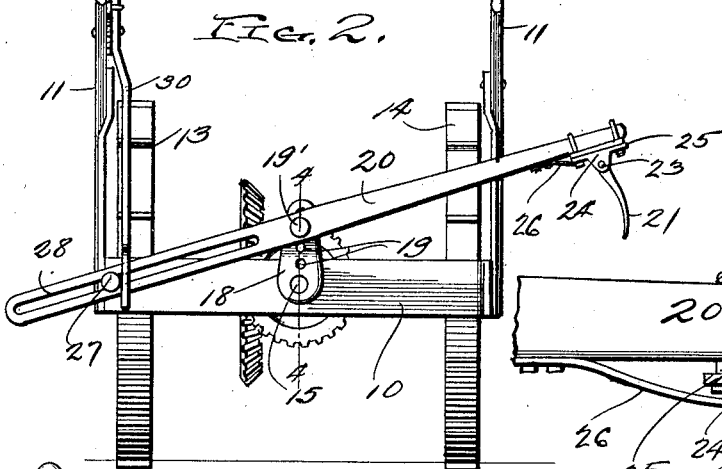
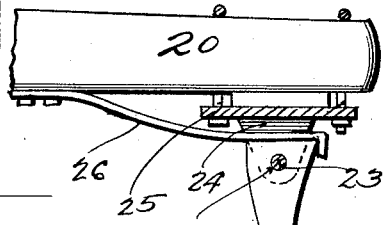
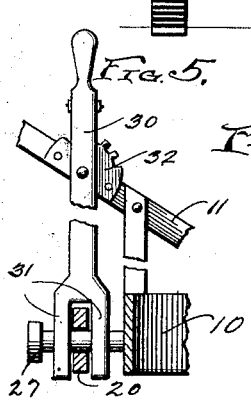
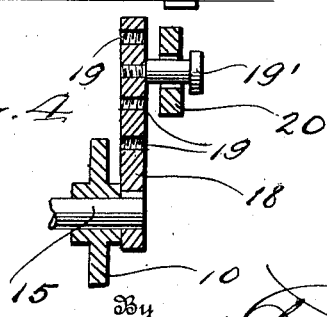
Inventor
Ralph D. Estes
Attorneys

UNITED STATES PATENT OFFICE.

RALPH DEWEY ESTES, OF ESTES, VIRGINIA.

CORN-THINNER.

1,394,291.  Specification of Letters Patent.  Patented Oct. 18, 1921.

Application filed November 18, 1919. Serial No. 338,942.

*To all whom it may concern:*

Be it known that I, RALPH D. ESTES, a citizen of the United States, residing at Estes, in the county of Rappahannock, State of Virginia, have invented certain new and useful Improvements in Corn-Thinners; and I do hereby declare the following to be a full, clear, and exact description of the invention, such as will enable others skilled in the art to which it appertains to make and use the same.

This invention relates to corn thinners of that class in which the stands that are to be removed, are chopped from the row.

It is the object of the invention to provide a construction that will have a very light draft, that will be positive and efficient in its operation and which furthermore may be connected behind a plow so that the plowing or cultivation of the corn and the thinning of it may both be performed at one operation.

Other objects and advantages of the invention will be apparent from the following description.

In the drawings:

Figure 1 is a top plan view of an implement embodying the present invention.

Fig. 2 is a rear elevation of the implement with the chopping hoe raised to its limit.

Fig. 3 is a detail view showing the manner of yieldably mounting the chopping hoe on its beam.

Fig. 4 is a sectional view on line 4—4 of Fig. 2 and showing the crank arm with its shiftable crank pin for varying the throw of the chopping hoe.

Fig. 5 is a detail view, partly broken away and showing the arrangement of the lever through the medium of which the beam 20 of the chopping hoe is shifted to cause the hoe to strike the hill at different points of its length.

Referring now to the drawings the present implement comprises a substantially rectangular frame 10, of any desired specific construction and provided at its forward end with means for connecting it to a plow or a tractor or for connecting draft animals with it, while at the sides of the frame are provided handles 11 through the medium of which the frame may be manipulated by a person walking at the rear, when specific conditions of use dictate.

Transversely of the frame 10 is mounted an axle 12 on which are the independently rotatable wheels 13 and 14 that support the frame and of which the wheel 13, constitutes a bull wheel from which the chopping hoe is actuated.

Longitudinally of the rear end portion of the frame 10 is mounted in suitable bearings, a shaft 15 having at its forward end a beveled gear 16 that meshes with a similar gear 17 carried on the inner face of the wheel 13, whereby the shaft 15 is driven from the wheel 13.

Upon the rear end of the shaft 15 is fixed a crank arm 18 having a longitudinal series of threaded openings 19 designed to receive at different distances from the shaft 15, a crank pin 19' which is engaged through a beam 20 that extends transversely of the frame 10 to the rear of it and which carries at one end a chopping hoe blade 21. This hoe blade has a perforation 22 transversely at its upper end portion, through which is engaged a pivot bolt 23 that is passed also through the depending ears 24 of a plate 25 secured in any desired manner against the lower face of the beam 20. The upper end of the hoe 21 is flattened and there bears upon it one end of a leaf spring 26, the other end of which is secured against the lower face of the beam 20. This spring serves to hold the hoe blade 21 normally and yieldably at a given angle to the beam but permits the hoe blade to swing on its pivot and pass from engagement with any obstruction that it might encounter in its operation, as hereinafter explained. The pivotal movement of the hoe blade is of course limited by the plate 25, the parts being so proportioned that before the hoe blade may swing to a position out of the influence of the spring 26 to return it to its predetermined angle to the beam 20, the flattened upper end of the hoe blade will have swung to engage the corresponding portion of the spring 26 between its corner and the plate 25.

From the rear end of the frame 10 there projects a guide rod 27 that engages a slot 28 formed longitudinally of the hoe beam 20 at its opposite end from the hoe blade.

With this construction it will be of course understood that as the crank arm 18 rotates with the shaft 15, its crank pin will give to the connected point of the hoe beam 20, a circular swinging movement in a plane transverse to the frame 10 and that by reason of the rear end of the beam 20 having sliding connection with the guide arm, the hoe blade will be caused to traverse an elliptical orbit, the blade moving away from the frame in the upper half of its orbit and toward the frame in the lower half of its orbit. When the machine advances, the effect is to develop a helical orbit including substantially elliptical convolutions. The result is that the stands of corn are at intervals hoed or chopped out of the hill and there remain equally spaced stands.

In practice, it occurs at times, that the planted seeds fail to come up and there is in consequence a gap in the row. In the thinning operation, it is of course not desirable that the stand be removed at either side of the gap, that would serve to form a wider gap. On the contrary, the stands at both sides of the gap are permitted to remain or in any event, the stands at the far side of the gap, and the chopping operation then begins at the next adjacent stand. In order that the hoe blade 21 may be swung longitudinally of the row to effect this adjustment, a hand lever 30 is pivotally connected with one of the handles 11 and its lower end is forked, as shown at 31, to straddle the beam 20 adjacent to the guide rod 27. The upper end of the lever 30 may be grasped and swung forwardly or rearwardly with a resultant reverse movement of the rear end of the beam along the rod 27. The opening through the beam 20 that is engaged by the crank pin 19', is sufficiently large to permit of lateral rocking movement of the beam so as throw the other end that carries the hoe 21, forwardly or rearwardly of the row, as the case may be. A notched segment 32 is mounted upon the handle 11 in position for engagement by a hand latch 33 that is carried by the lever so that the lever may be held in its different adjusted position.

What is claimed is:

1. A corn thinner comprising a supporting frame, a shaft mounted in the frame and having a crank arm, a crank pin for the arm shiftable toward and away from the shaft, a hoe beam slidably connected with the frame at one end laterally of the frame beyond the crank arm and having a hoe blade at its opposite end, the beam at an intermediate point having pivotal connection with the crank pin, and means for rotating the shaft.

2. A corn thinner comprising a frame, a shaft rotatably carried by the frame and having a crank arm, a crank pin carried by the arm and shiftable toward and away from the shaft, a hoe beam pivotally connected with the crank pin and having a longitudinal slot, a guide arm projecting rearwardly from the frame at one side of the crank arm and engaged in the slot, a hoe blade carried by the beam, at right angles thereto and at the opposite side of the crank arm from the guide arm and means for rotating the shaft.

3. A corn thinner comprising a carrier frame, a chopping hoe carried by the frame and movable in a plane at an angle to the direction of progress of the frame, and means for adjusting the hoe with respect to the frame in the plane of progress of the frame.

4. A corn thinner including a carrier frame, a hoe having a beam, a bull wheel for the frame, means connected with the bull wheel for swinging the hoe in a direction at an angle to the progress of the frame and means connected with the beam for adjusting the hoe blade with respect to the frame in the plane of progress of the frame.

In testimony whereof, I affix my signature, in the presence of two witnesses.

RALPH DEWEY ESTES.

Witnesses:
E. E. JOHNSON,
J. W. HUMPHRIES.